US008909215B2

(12) United States Patent
Vashi et al.

(10) Patent No.: US 8,909,215 B2
(45) Date of Patent: Dec. 9, 2014

(54) CONTROL OF MEASUREMENT MESSAGING IN A MOBILE DEVICE

(71) Applicant: Apple Inc., Cupertino, CA (US)

(72) Inventors: Prashant H. Vashi, Sunnyvale, CA (US); Gaurav R. Nukala, Sunnyvale, CA (US); Sharad Garg, San Jose, CA (US)

(*) Notice: Subject to any disclaimer, the term of this patent is extended or adjusted under 35 U.S.C. 154(b) by 0 days.

(21) Appl. No.: 14/059,114

(22) Filed: Oct. 21, 2013

(65) Prior Publication Data
US 2014/0119219 A1 May 1, 2014

Related U.S. Application Data

(63) Continuation of application No. 12/987,012, filed on Jan. 7, 2011, now Pat. No. 8,565,756.

(51) Int. Cl.
*H04W 24/00* (2009.01)
*H04W 24/10* (2009.01)

(52) U.S. Cl.
CPC .................................. *H04W 24/10* (2013.01)
USPC ............ 455/425; 455/450; 455/423; 455/424

(58) Field of Classification Search
USPC .................................. 455/450, 425, 423, 424
See application file for complete search history.

(56) References Cited

U.S. PATENT DOCUMENTS 6,721,564 B1 * 4/2004 Kobayashi .................... 455/436

\* cited by examiner

*Primary Examiner* — Kwasi Karikari
(74) *Attorney, Agent, or Firm* — Womble Carlyle Sandridge & Rice, LLP

(57) ABSTRACT

A method to control measurement messaging is performed at a mobile wireless device. The mobile wireless device transmits a first measurement message to a radio access network in a wireless network and stores the first measurement message pending receipt of an acknowledgement from the radio access network. Before receiving the acknowledgement to the first measurement message, the mobile wireless device determines at least one parameter included in the first measurement message requires updating. The mobile wireless device deletes the stored pending first measurement message and transmits a second measurement message to the radio access network including an updated value for the at least one parameter in the first measurement message.

20 Claims, 13 Drawing Sheets

CONTROL OF MEASUREMENT MESSAGING IN A MOBILE DEVICE

CROSS REFERENCE TO RELATED APPLICATIONS

This application is a continuation of co-pending U.S. application Ser. No. 12/987,012, filed Jan. 7, 2011, entitled "CONTROL OF MEASUREMENT MESSAGING IN A MOBILE DEVICE", the disclosure of which is hereby incorporated by reference in its entirety for all purposes. This patent application is also related to U.S. Pat. No. 8,504,013 entitled "RADIO RESOURCE MANAGEMENT IN A MOBILE DEVICE" by Prashant H. Vashi et al., issued Aug. 6, 2013.

TECHNICAL FIELD

The described embodiments relate generally to wireless mobile communications. More particularly, a method is described for controlling measurement messaging between a mobile wireless communication device and a wireless communication network.

BACKGROUND OF THE INVENTION

Mobile wireless communication devices, such as a cellular telephone or a wireless personal digital assistant, can provide a wide variety of communication services including, for example, voice communication, text messaging, internet browsing, and electronic mail. Mobile wireless communication devices can operate in a wireless communication network of overlapping "cells", each cell providing a geographic area of wireless signal coverage that extends from a radio network subsystem located in the cell. The radio network subsystem can include a base transceiver station (BTS) in a Global System for Communications (GSM) network or a Node B in a Universal Mobile Telecommunications System (UMTS) network. The radio network subsystem can also be referred to as a radio access network in a Code Division Multiple Access (CDMA) network and can include a BTS.

The mobile wireless communication device can receive signals transmitted from one or more cells in the wireless communication network. The radio network subsystems in each of the cells can be located at different distances from the mobile wireless communication device, and therefore signals received at the mobile wireless communication device can vary in signal strength and/or signal quality. The mobile wireless communication device can measure and monitor the received signals to determine to which cells a connection can be achieved and maintained. Together with one or more radio network subsystems in the wireless communication network, the mobile wireless communication device can select to which cells to connect and disconnect as the mobile wireless communication device moves throughout the wireless network.

The mobile wireless communication device can be connected to one or more cells in the wireless communication network simultaneously. Measurement messages (or more generally management messages) can be transmitted by the mobile wireless communication device to the wireless communication network informing the wireless communication network of changes to radio frequency signal conditions observed by the mobile wireless communication device. Certain messages transmitted by the mobile wireless communication device can require acknowledgement from the wireless communication network before the mobile wireless communication device considers their transmission complete. Messages that do not receive an acknowledgement from the wireless communication network can be retransmitted by the mobile wireless communication device in order to ensure their correct reception by the wireless communication network. Multiple retransmissions of a message to the wireless communication network from the mobile wireless communication device without an attendant acknowledgement being received by the mobile wireless communication device can ultimately result in termination of one or more connections between the mobile wireless communication device and the wireless communication network.

Multiple connections between the mobile wireless communication device and radio network subsystems located in one or more cells in the wireless communication network can be used for different services, such as for simultaneous voice and data, as well as for diversity during handoff between cells as the mobile wireless communication device traverses the wireless communication network. Measurement messages for each of the multiple connections can be sent to the wireless communication network to indicate changes in received radio frequency signal conditions at the mobile wireless communication device. When the received radio frequency signals at the mobile wireless communication device can change rapidly, a measurement message sent by the mobile wireless communication device to the wireless communication network previously can become obsolete before an acknowledgement to the measurement message has been received at the mobile wireless communication device. When no acknowledgement has been received, the mobile wireless communication device can continue to retransmit the obsolete message to the wireless communication network. Retransmission by the mobile wireless communication device can prove counterproductive, as the information conveyed in the measurement message can be supplanted by new measurements of signals received at the mobile wireless communication device. When repeated re-transmissions of a message are sent without acknowledgements being received by the mobile wireless communication device from the wireless communication network, termination of one or more connections between the mobile wireless communication device and the wireless communication network can occur. This termination of connections can be unnecessary, as the information being conveyed by the retransmissions can be obsolete.

Thus there exists a need to control measurement messaging between a mobile wireless communication device and a wireless communication network during dynamically changing network conditions.

SUMMARY OF THE DESCRIBED EMBODIMENTS

The described embodiments relate generally to wireless mobile communications. More particularly, a method is described for controlling measurement messaging between a mobile wireless communication device and a wireless communication network.

In one embodiment, a method to control measurement messaging is performed at a mobile wireless communication device when the mobile wireless communication device is connected to a radio access network wireless network. The method includes at least the following steps. The mobile wireless device transmits a first measurement message to the radio access network in the wireless network. The mobile wireless device stores the first measurement message pending receipt of an acknowledgement of the first measurement message from the radio access network. Before receiving the acknowledgement to the first measurement message from the radio access network, the mobile wireless device determines at least one parameter included in the first measurement message requires updating. The mobile wireless device deletes the stored pending first measurement message and transmits a second measurement message to the radio access network in the wireless network. The second measurement message includes an updated value for the at least one parameter in the first measurement message.

In a further embodiment, a mobile wireless communication device including a wireless transceiver to transmit and receive signals from a radio access network in a wireless network and an application processor coupled to the wireless transceiver is described. The application processor is arranged to execute the following instructions. The application processor forms a first measurement message and transfers the first measurement message to the wireless transceiver. The application processor determines at least one parameter included in the first measurement message requires updating before receiving an acknowledgement of the first measurement message from the radio access network in the wireless network. The application processor commands the wireless transceiver to delete the first measurement message, forms a second measurement message and transfers the second measurement message to the wireless transceiver. The wireless transceiver transmits the first measurement message to the radio access network in the wireless network. The wireless transceiver stores the first measurement message pending receipt of the acknowledgement to the first measurement message from the radio access network. The wireless transceiver deletes the stored pending first measurement message and transmits the second measurement message to the radio access network in the wireless network. The second measurement message includes an updated value for the at least one parameter in the first measurement message.

In another embodiment, a non-transitory computer program product encoded in a non-transitory computer readable medium for controlling a mobile wireless device connected to a radio access system in a wireless network is described. The non-transitory computer program product includes non-transitory computer program code for transmitting a first measurement message to the radio access system in the wireless network. The non-transitory computer program product also includes non-transitory computer program code for storing the first measurement message pending receipt of an acknowledgement of the first measurement message from the radio access system. The non-transitory computer program product further includes non-transitory computer program code for determining when at least one parameter included in the first measurement message is out of date and deleting the stored out of date first measurement message when no acknowledgement of the first measurement message is received. The non-transitory computer program product yet further includes non-transitory computer program code for transmitting a second measurement message to the radio access system in the wireless network. The second measurement message includes an updated value for the out of date at least one parameter in the first measurement message.

In a further embodiment, a method for controlling measurement messaging between a mobile wireless device and a wireless network is described. The method includes, at the mobile wireless device, at least the following steps. The mobile wireless device measures radio frequency parameters of signals received from the wireless network. The mobile wireless device transmits a first measurement message to the wireless network that includes at least one of the measured radio frequency parameters. The mobile wireless device retransmits the first measurement message when an acknowledgement to the first measurement message is not received from the wireless network. The mobile wireless device stops retransmitting the first measurement message when at least one of the measured radio frequency parameters exceeds a pre-determined threshold.

BRIEF DESCRIPTION OF THE DRAWINGS

The invention and the advantages thereof may best be understood by reference to the following description taken in conjunction with the accompanying drawings.

DETAILED DESCRIPTION OF EXAMPLE EMBODIMENTS

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Figure 1:
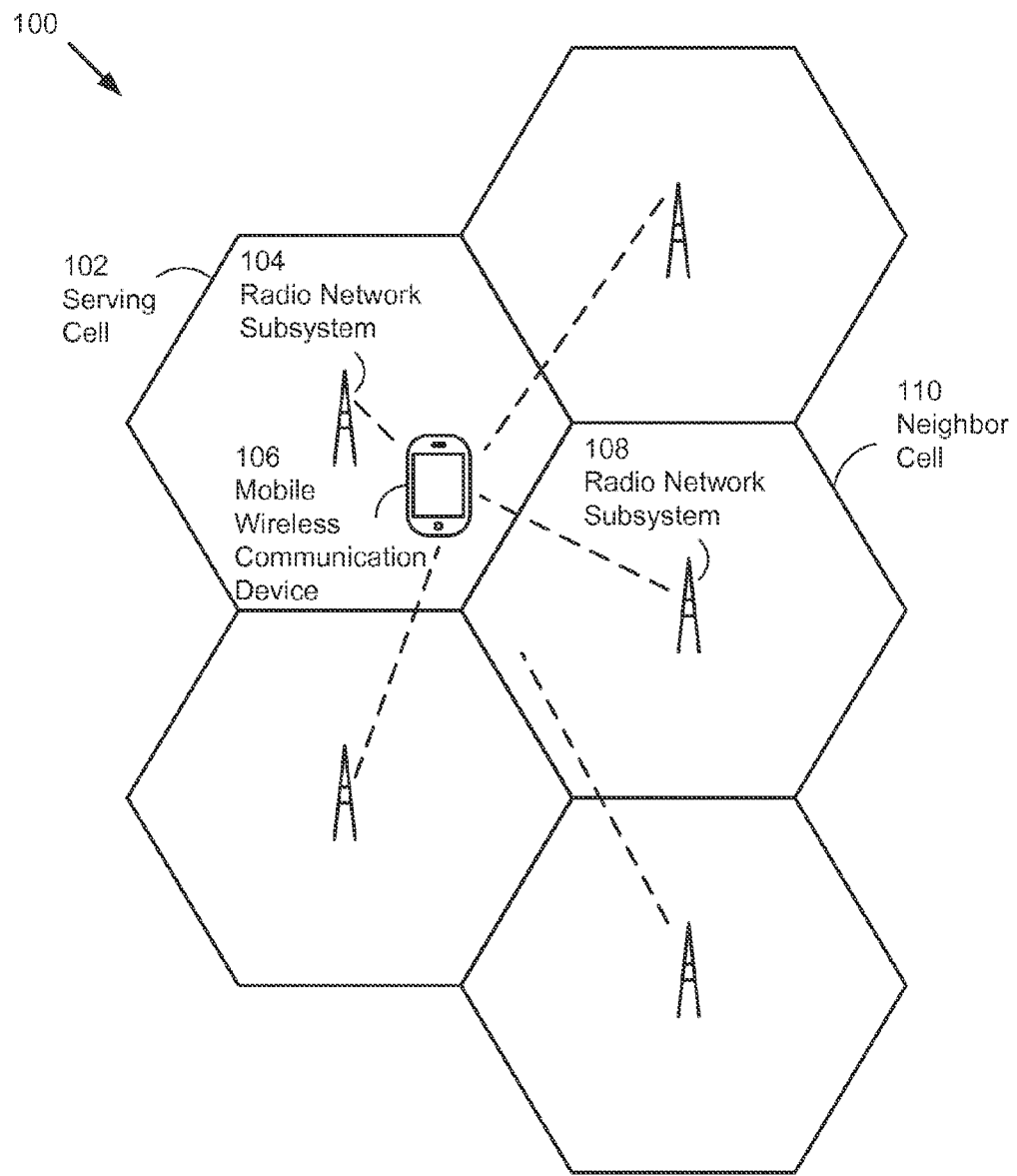
FIG. 1 illustrates a mobile wireless communication device located within a wireless cellular communication network.

FIG. 1 illustrates a wireless communication network 100 of overlapping wireless communication cells to which a mobile wireless communication device 106 can connect. Each wireless communication cell can cover a geographic area extending from a centralized radio network subsystem. The mobile wireless communication device 106 can receive communication signals from a number of different cells in the wireless communication network 100, and each cell can be located at a different distance from the mobile wireless communication device 106. In a second generation (2G) wireless communication network 100, e.g. a network following a Global System for Mobile Communications (GSM) protocol, the mobile wireless communication device 106 can connect to a radio network subsystem in the wireless communication network 100 using one radio link at a time serially. For example, the mobile wireless communication device 106 can be connected initially to a radio network subsystem (RNS) 104 in a serving cell 102. The mobile wireless communication device 106 can monitor signals from radio network subsystems in neighbor cells. The mobile wireless communication device 106 can transfer its connection from the radio network subsystem 104 in the serving cell 102 to a radio network system 108 in a neighbor cell 110 as the mobile wireless communication device 106 moves within the wireless communication network 100. The mobile wireless communication device 106 can monitor signals from nearby cells and can keep track of signal quality received at the mobile wireless communication device 106 from each of the cells. Information about received signal quality can be communicated by the mobile wireless communication device 106 to the wireless communication network 100 using measurement messages (or more generally measurement messages or control messages). The wireless communication network 100 can use the information provided in the measurement messages to determine if and when to change the cell to which the mobile wireless communication device 106 can be connected.

In a third generation (3G) wireless communication network 100, such as a network based on a Universal Mobile Telecommunication System (UMTS) protocol, the mobile wireless communication device 106 can be connected to one or more radio network subsystems simultaneously through multiple radio access bearers. Each of the radio access bearers can transport a different communication service independently, such as a voice service on a first radio access bearer and a data service on a second radio access bearer. The mobile wireless communication device 106 can also be connected by multiple radio access bearers simultaneously to the radio network subsystem (RNS 104) in the serving cell 102 (if the RNS 104 supports such a simultaneous multiple radio link connection). The mobile wireless communication device 106 can also be connected by a first radio access bearer to the RNS 104 in the serving cell 102 and to a second RNS 108 in the neighbor cell 110 simultaneously. Advanced mobile wireless communication devices 106, sometimes referred to as "smart" phones, can provide a diverse array of services to the user using a connection with multiple radio access bearers.

In a code division multiple access (CDMA) network, the mobile wireless communication device 106 can also be connected through multiple radio links to the wireless communication network 100, particularly during a procedure known as soft handoff (or soft handover). Continuous access to communication services while the mobile wireless communication device 106 traverses the wireless communication network 100 can require a seamless handoff between different radio network subsystems located in different cells. The mobile wireless communication device 106 can transmit measurement messages to the wireless communication network 100 that can contain measures of signal quality received by the mobile wireless communication device 106 from the one or more different radio network subsystems. Representative measures of signal quality can include received signal code power (RSCP) and an energy per chip to total noise/interference ratio ($E_c I_o$). While the mobile wireless communication device 106 is connected to a base transceiver station in a first cell by a first radio frequency connection, the wireless communication network 100 can add a second radio frequency connection between the mobile wireless communication device 106 and a base transceiver station in a second cell to provide a "soft handoff" before terminating the first radio frequency connection. The mobile wireless communication device 106 can thus be connected to the first base transceiver station in the first cell, then to two base transceiver stations located in two different cells simultaneously, and then to the second base transceiver station in the second cell. A successful soft handoff can maintain a communication link between the mobile wireless communication device 106 and the wireless communication network 100 when the first radio frequency connection deteriorates in signal quality while the second radio frequency connection improves in signal quality.

The mobile wireless communication device 106 can be connected to two or more cells simultaneously, and radio frequency signals from each of the cells to which the mobile wireless communication device 106 is connected can be used together to improve call performance. Communication of measurement information gathered at the mobile wireless communication device 106 and provided from the mobile wireless communication device 106 to the wireless communication network 100 can provide critical information for determining to which cells to connect or disconnect, thereby providing improved call stability. As the measurement messages transmitted by the mobile wireless communication device 106 to the wireless communication network 100 can contain critical information, a wireless communication protocol can be used by the mobile wireless communication device 106 that can require that the measurement messages be acknowledged by the wireless communication network 100 to ensure correct reception. When no acknowledgement has been received by the mobile wireless communication device 106 from the wireless communication network during a pre-determined time interval, the mobile wireless communication device 106 can re-transmit the message that has not been acknowledged. This retransmission can be repeated a pre-determined number of times. After a pre-determined number of successive re-transmissions that do not receive acknowledgement from the wireless communication network 100, the mobile wireless communication device 106 can determine that at least one of the radio frequency connections to the wireless communication network is "defective." One or more of the radio frequency connections between the mobile wireless communication device 106 and the wireless communication network 100 can then be terminated. Typically all of the radio frequency connections can be terminated resulting in a "dropped" call, as perceived by the user of the mobile wireless communication device 106.

Figure 2:
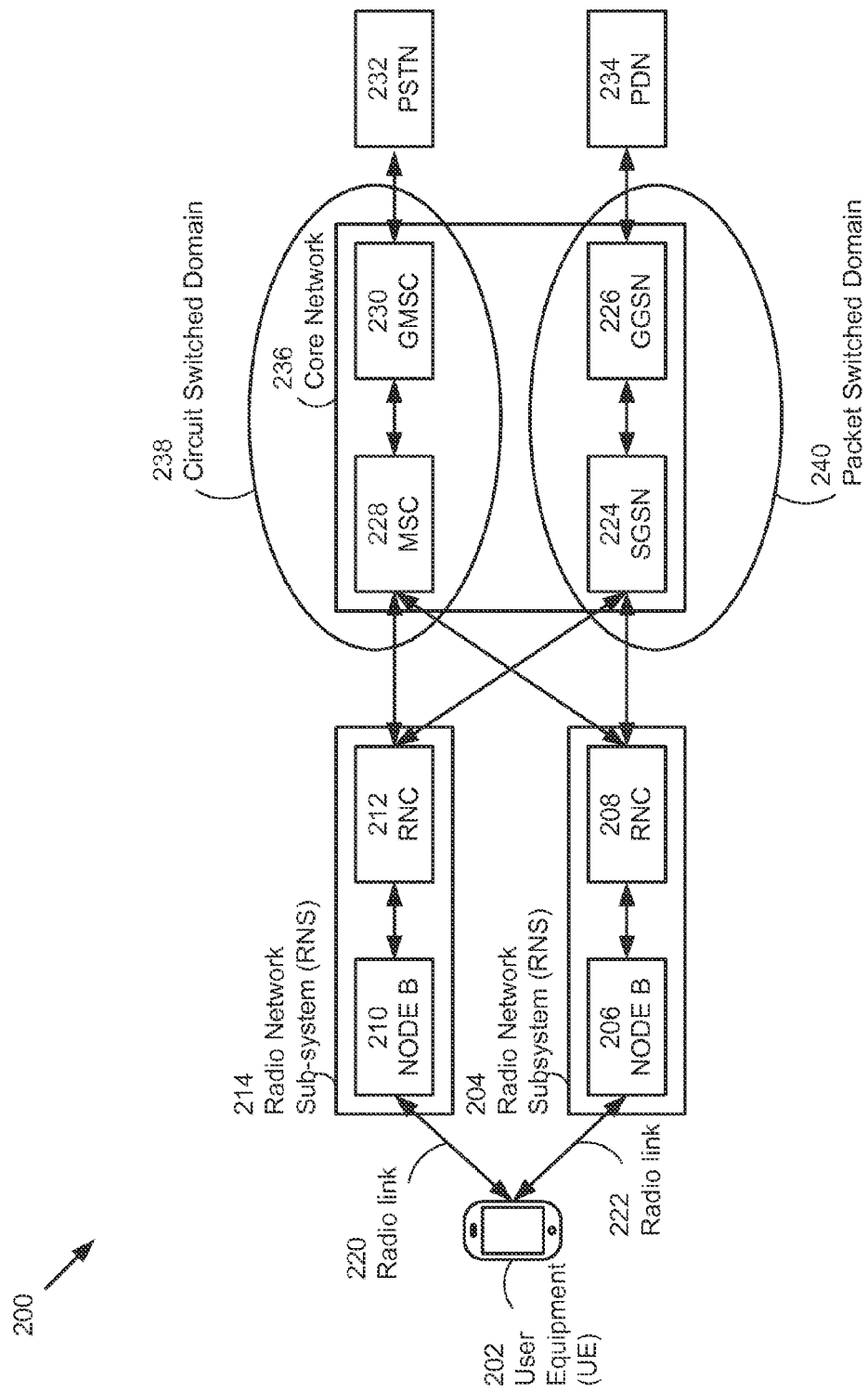
FIG. 2 illustrates a hierarchical architecture for a wireless communication network.

FIG. 2 illustrates a 3G UMTS wireless communication network 200 including UMTS access network elements. The mobile wireless communication device 106 operating in the UMTS wireless communication network 200 can be referred to as user equipment (UE) 202. (Wireless mobile communication devices 106 can include the capability of connecting to different wireless communication networks that use different wireless radio access network technologies, such as to a GSM network and to a UMTS network; thus the description that follows can also apply to such "multi-network" devices as well.) In a UMTS wireless network, the UE 202 can connect to one or more radio network subsystems (RNS) 204/214 through one or more radio links 220/222. The first RNS 204 can include a radio access system, known as a "Node B" 206, which transmits and receives radio frequency signals. The Node B 206 can connect with a radio network controller (RNC) 208 in the radio network subsystem 204 that manages communication between the Node B 206 and the core network 236. Similarly the second RNS 214 can include Node B 210 and RNC 212 that also connect to the core network 236. Unlike a mobile wireless communication device 106 in a 2G GSM network, the UE 202 in the UMTS network can connect to more than one RNS simultaneously. Each RNS can provide a separate connection for a different service to the UE 202, such as for a voice connection through a circuit switched voice network and for a data connection through a packet switched data network. Each radio link 220/222 can also include one or more radio access bearers that transport signals between the UE 202 and the respective RNS 204/214. Multiple radio access bearers can be used for separate services on separate connections or for supplementing a service with additional radio resources for a given connection.

The core network 236 can include both a circuit switched domain 238 that can carry voice traffic to and from an external public switched telephone network (PSTN) 232 and a packet switched domain 240 that can carry data traffic to and from an external public data network (PDN) 234. Voice and data traffic can be routed and transported independently by each domain. Each RNS can combine and deliver both voice and data traffic to mobile wireless communication devices 106. The circuit switched domain 238 can include multiple mobile switching centers (MSC) 228 that connect a mobile subscriber to other mobile subscribers or to subscribers on other networks through gateway MSCs (GMSC) 230. The packet switched domain 240 can include multiple support nodes, referred to as serving GPRS support nodes (SGSN) 224, that route data traffic among mobile subscribers and to other data sources and sinks in the PDN 234 through one or more gateway GPRS support nodes (GGSN) 226. The circuit switched domain 238 and the packet switched domain 240 of the core network 236 can each operate in parallel, and both domains can connect to different radio access networks simultaneously.

The UMTS wireless communication network 200 illustrated in FIG. 2 can support several different configurations in which the UE 202 connects through multiple radio access bearers to the wireless communication network. In a first configuration, a "soft" handoff of the UE 202 can occur between the first RNS 204 and the second RNS 214 as the UE 202 changes location within the UMTS wireless communication network 200. A first radio access bearer through the first RNS 204 can be supplemented by a second radio access bearer through the second RNS 214 before deactivating the first radio access bearer. In this case, multiple radio access bearers can be used for enhancing a connection's reliability, and the UE 202 can typically be using one service through the multiple radio access bearers. In a second configuration, the UE 202 can connect through the first RNS 204 to the packet switched domain 240 to support a packet data connection and simultaneously connect through the second RNS 214 to the circuit switched domain 238 to support a voice connection. In this case, the UE 202 can maintain a different radio access bearer for each service. In a third configuration, a single RNS can support multiple radio access bearers to the same UE 202, each radio access bearer supporting a different service. For the second and third configurations, it can be preferred that the establishment and release of each radio access bearer be independent as they can be associated with different services simultaneously.

Figure 3:
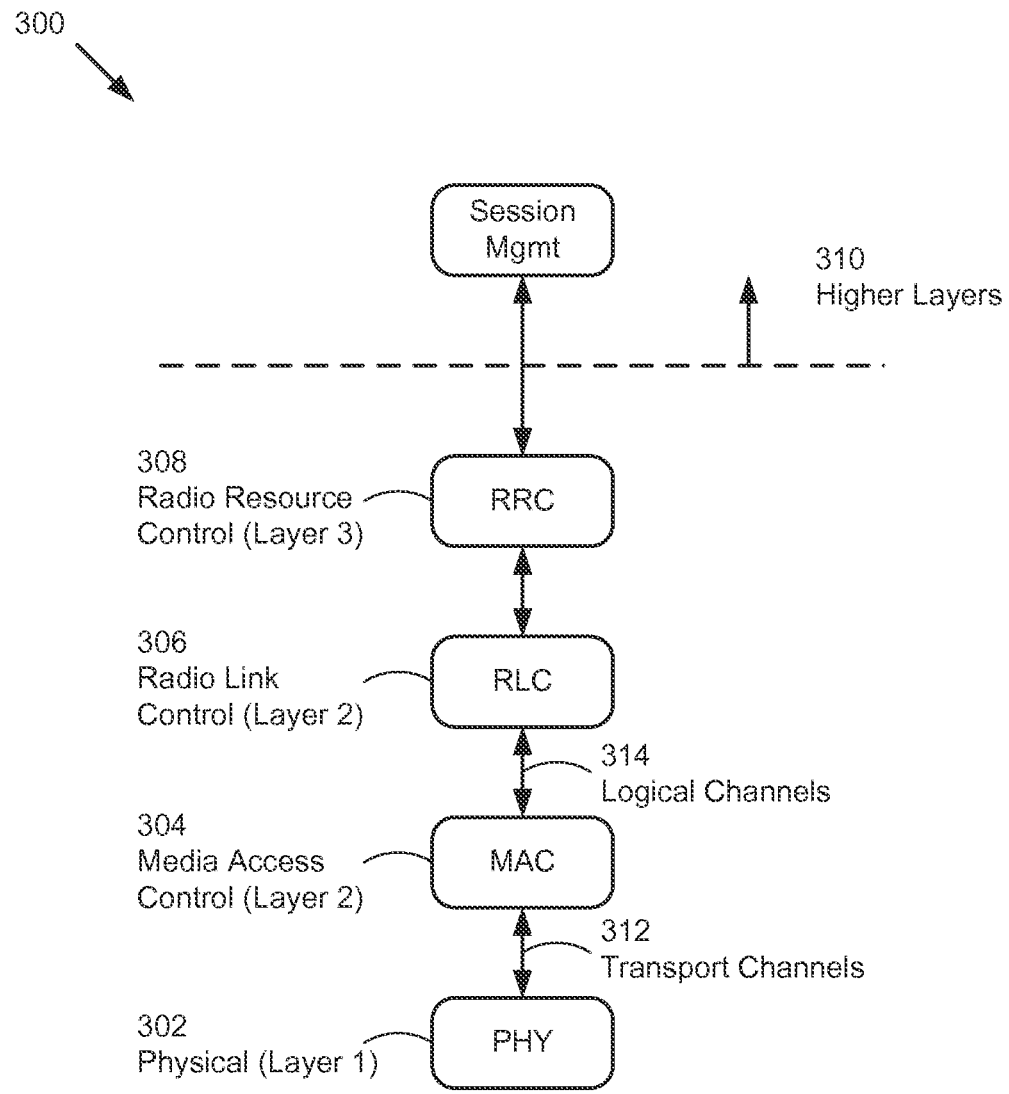
FIG. 3 illustrates a communication protocol stack for a mobile wireless communication device used in the wireless communication network of FIG. 2.

FIG. 3 illustrates a layered protocol stack 300 with which a UE 202 can establish and release connections with the UMTS wireless communication network 200 through an exchange of messages. Higher layers 310 in the layered protocol stack 300, such as a session management layer, can request a connection of the UE 202 to the wireless communication network 200. The connection request from the session management layer can result in a series of discrete packetized messages known as radio resource control (RRC) service data units (SDU) passed from an RRC processing block 308 in layer 3 of the protocol stack 300 to a radio link control (RLC) processing block 306 in layer 2 of the protocol stack 300. A layer 3 SDU can represent a basic unit of communication between layer 3 peers at each end of the communication link. Each layer 3 RRC SDU can be segmented by the RLC processing block 306 into a numbered sequence of layer 2 RLC protocol data units (PDU) for transmission over a communication link. A layer 2 RLC PDU can represent a basic unit of data transfer between layer 2 peers at each end of the communication link. Layer 2 RLC PDUs can be transmitted through additional lower layers in the layer protocol stack 300, namely a media access control (MAC) layer 304 that maps logical channels 314 into transport channels 312 and a physical layer 302 that provides a radio link "air" interface. At the receiving end of the communication link (not shown), the layer 2 RLC PDUs can be reassembled by another RLC processing block to form a complete layer 3 SDU to deliver to a complementary RRC processing block in a remote device (or other termination).

The layer 2 RLC protocol can be configured to operate in an acknowledged mode to provide reliable transport of the layer 2 PDUs over a noisy transmission channel, such as a wireless radio link "air" interface between the mobile wireless communication device 106 and the wireless communication network 100. If a layer 2 PDU is lost during transmission or incorrectly received by the receiving end (for example the radio network subsystem to which the wireless mobile communication device 106 is connected), the layer 2 PDU can be retransmitted by the transmitting layer 2 RLC processing block 306 before the complementary receiving processing blocks reassemble the complete layer 3 SDU. Error checking and retransmission of the layer 2 PDUs can improve the probability of a correctly received and reassembled layer 3 SDU.

The layer 2 RLC protocol can use an automatic repeat request (ARQ) function to trigger retransmissions. The transmitting layer 2 RLC processing block 306 can receive a status report from the receiving layer 2 RLC processing block. The status report can be sent in response to a poll from the transmitting end or can be automatically sent by the receiving end. Polling of the receiving end can be accomplished by setting a polling bit in a field of a transmitted layer 2 PDU. For example, when a polling bit can be set in a layer 2 PDU having the last sequence number for a particular layer 3 SDU. The layer 2 processing block at the receiving end can recognize the polling bit and respond to the poll by indicating the highest sequence number layer 2 PDU in the layer 3 SDU for which all layer 2 PDUs equal to or earlier than the highest sequence number have been correctly received. Alternatively, the receiving end can automatically send a status report when a layer 2 PDU is received out of sequence or incorrectly received, thus alerting the transmitting end that a layer 2 PDU has been lost or corrupted during transmission. The transmitting end can respond to the status report by retransmitting any missing layer PDUs. A segmentation and reassembly function with error checking in the RLC layer 2 processing block 306 can ensure that layer 3 RRC SDUs are transmitted and received completely and correctly.

Figure 4:
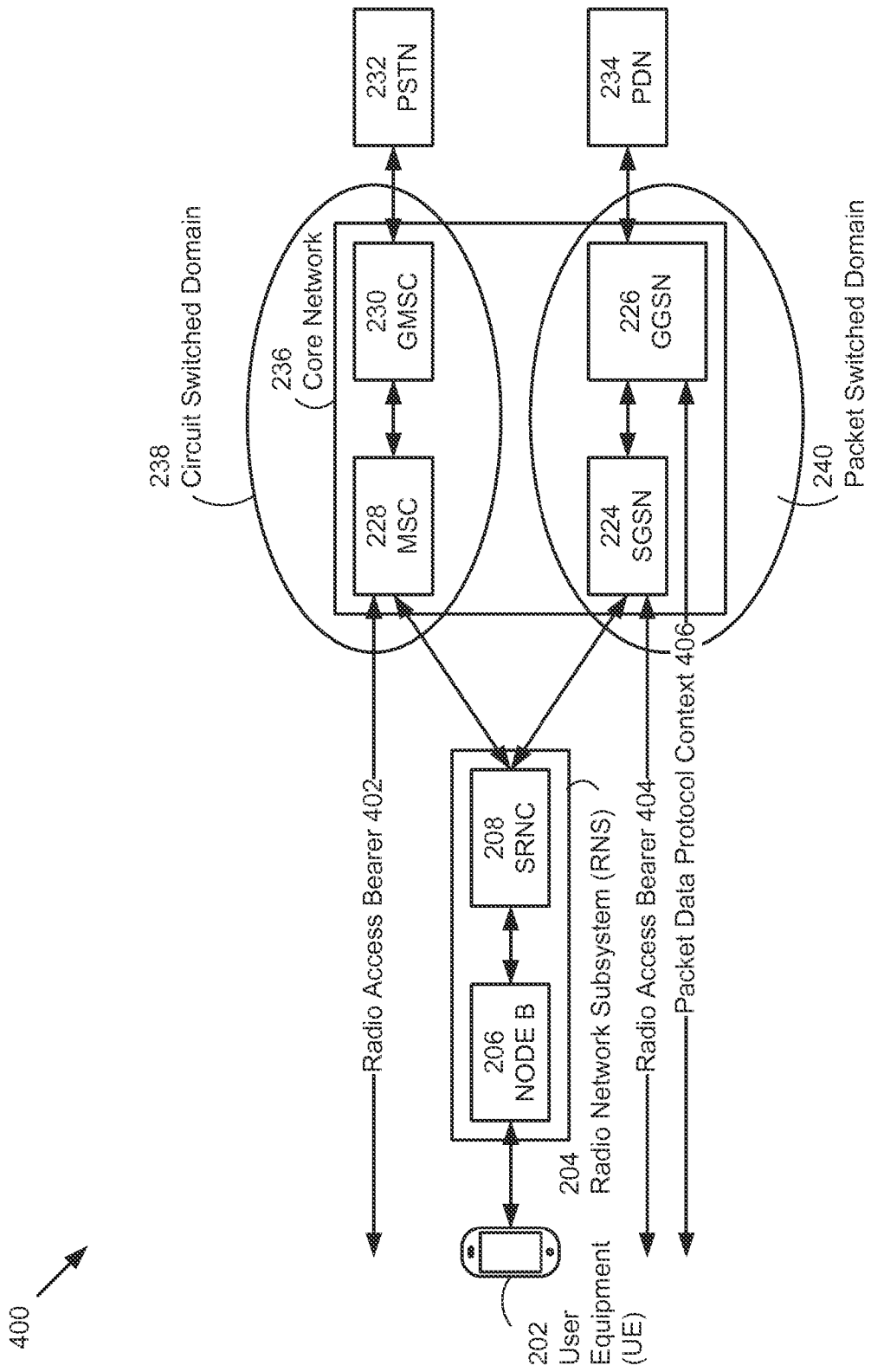
FIG. 4 illustrates a multiple radio access bearer wireless connection including circuit and packet switching.

As illustrated in FIGS. 2 and 4, a UMTS network can include two distinct domains, a circuit switched domain 238 to carry circuit switched traffic (such as voice or transparent data) and a packet switched domain 240 to transport packet data (such as internet connectivity or voice over IP). As shown in FIG. 4, the UE 202 can be simultaneously connected to the circuit switched domain 238 by a radio access bearer 402 to carry voice traffic and to the packet switched domain 240 through a radio access bearer 404 to carry data traffic. A radio access bearer can be considered a channel to transport a circuit switched data stream or a packet switched data stream between the UE 202 and the core network 236 through the RNS 204. The core network 236 can set characteristics of each radio access bearer including data rate and quality of service based on requirements for the data stream transported and on a user's subscription among other criteria. A packet data protocol (PDP) context 406 can provide a packet data connection between the UE 202 and the gateway GPRS support node (GGSN) 226 to support the exchange of internet protocol (IP) packets using the radio access bearer 404 over the wireless access network portion of the connection. The PDP context 406 can include a PDP address, such as an IP address, for the UE 202. The PDP context 406 can be activated by the UE 202 at the session management layer 310, and the radio access bearer 404 can be established and associated with the PDP context 406 to transport data for the UE 202. Once established, data can be sent as a series of layer 3 SDUs, each layer 3 SDU transported through numbered sequences of layer 2 PDUs as described above for FIG. 3.

Figure 5:
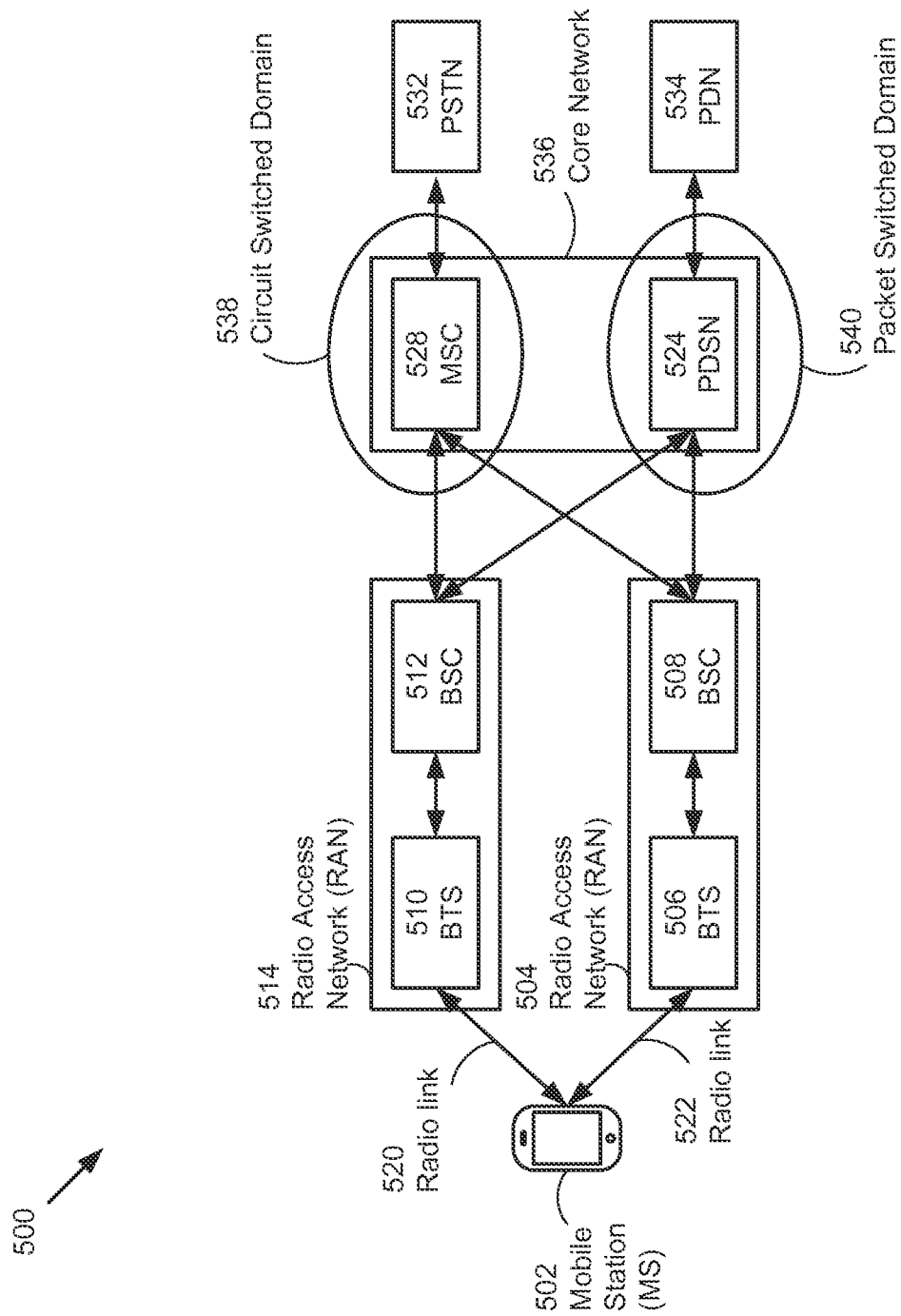
FIG. 5 illustrates a second hierarchical architecture for a wireless communication network.

FIG. 5 illustrates a hierarchical network architecture 500 for a CDMA network similar to the hierarchical network architecture shown in FIG. 2 for a UMTS network. A mobile station (MS) 502 can be connected to one or more radio access networks (RAN) 504/514 through radio links 520/522. The radio links 520/522 connect the mobile station 502 to the wireless communication network 100 through baseband transceiver stations (BTS) 506/510 located in respective RAN 504/514. The BTS 506/510 can be controlled by base station controllers (BSC) 508/512. The RAN 504/514 can be connected to a mobile switching center (MSC) 528 located in a circuit switched domain 538 that can handle circuit switched traffic, such as voice calls, to interconnect the MS 502 to the public switched telephone network (PSTN) 532. The RAN 504/514 can also be connected to a packet data serving node (PDSN) 524 located in a packet switched domain 540 that can handle packet switched traffic, such as data connections, to interconnect the MS 502 to a public data network (PDN) 534.

As described above for the UE 202, the MS 502 can be connected simultaneously to more than one RAN 504/514 to provide improved performance and seamless handoff between cells. The MS 502 can monitor radio frequency signals received from the BTS 506/510 to which the MS 502 can be connected as well as from additional BTS located in other cells to which the MS 502 can also connect. Based on measurements of radio frequency signals received from the BTS, the MS 502 can transmit messages that contain measurement information to the wireless communication network 100 and can receive control messages from the wireless communication network 100 that can add or delete connections to one or more of the BTS monitored.

Figure 6:
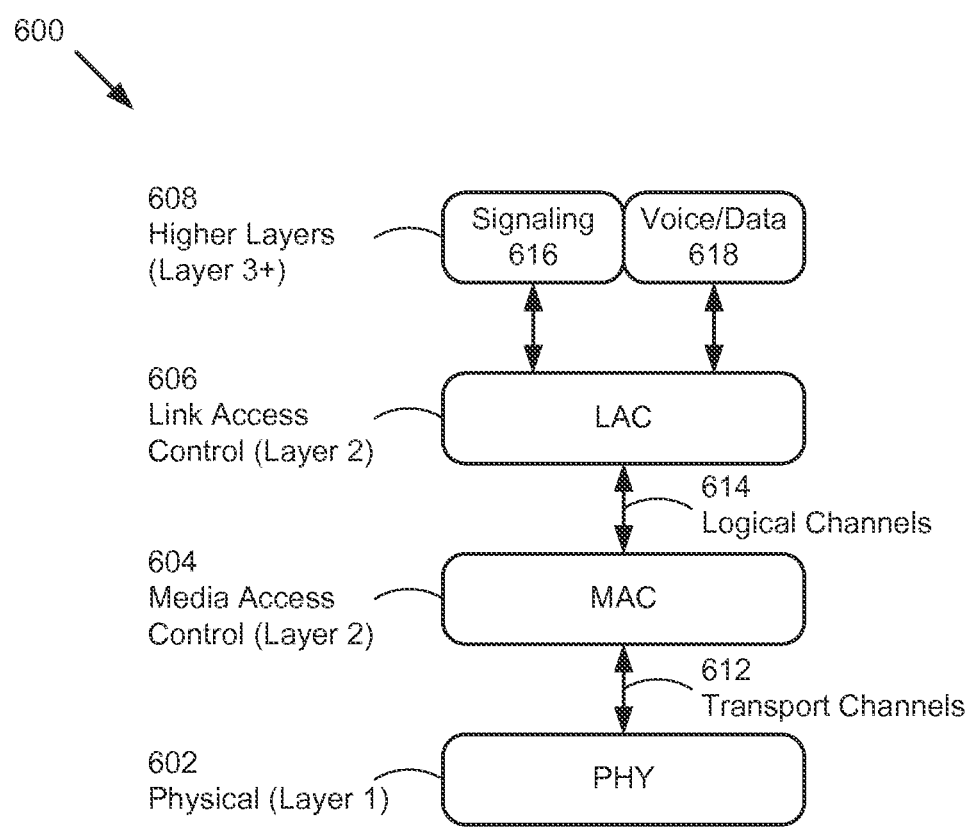
FIG. 6 illustrates a communication protocol stack for a mobile wireless communication device used in the wireless communication network of FIG. 5.

FIG. 6 illustrates a layered protocol stack 600 for the CDMA MS 502 comparable to the layered protocol stack 300 shown in FIG. 3 for the UMTS UE 202. A set of higher layers 608 can include separate processing blocks and communication paths for signaling 616 and for voice/data 618. Communication between a layer 3 signaling layer to a layer 2 link access control (LAC) 606 layer can use discrete signaling messages or packets that will be referred to as layer 3 SDUs just as described above. The layer 2 LAC 606 can divide the layer 3 SDU into multiple layer 2 PDUs that can be transported over logical channels 614 to the layer 2 media access control (MAC) 604 processing layer. The MAC 604 layer can multiplex the layer 2 PDUs onto transport channels 612, and the layer 1 physical layer (PHY) 602 can format the PDUs into radio frequency transmissions to transmit to the BTS 506/510 in the RAN 504/514 in the wireless communication network 100. The reverse processing can then occur at the destination remote device which can decode the received radio frequency transmissions into a series of layer 2 PDUs that can be re-assembled into a layer 3 SDU. Layer 2 PDUs received correctly can be acknowledged, while incorrectly received (or lost or uncorrectable) layer 2 PDUs can be not acknowledged. Note that Layer 2 PDUs can be checked at the RAN 504/514 in the access portion of the wireless network 500. The RAN 504/514 can acknowledge correctly received Layer 2 PDUs. The MS 502 can wait for acknowledgement of the Layer 2 PDU by the RAN 504/514 before determining that the Layer 2 PDU was received correctly. The layer 2 processing blocks in the MS 502 can retransmit the Layer 2 PDU when no acknowledgement is received.

As the MS 502 can periodically monitor received signals, including their signal quality, updated layer 3 messages can be formed and transmitted that can indicate updated signal quality values (or other measurements or calculations made periodically by the MS 502). As the radio frequency environment for the MS 502 can change rapidly as the MS 502 moves within the wireless communication network 500, a more recently formed layer 3 message can contain updated measurements that can supersede an previously formed and transmitted layer 3 message. The older transmitted layer 3 message and particularly one or more of the constituent layer 2 PDUs that can be used to transport the layer 3 message, can be pending acknowledgement of correct reception.

When transmission of the older layer 3 message is not complete, including receipt of acknowledgement for each of the layer 3 message's constituent layer 2 PDUs, the older layer 3 message can be "outdated" and no longer correctly describe the received signal conditions at the transmitting MS 502. In current implementations, the layer 3 processing blocks can be unaware of the incomplete reception of the layer 3 message. Instead the layer 3 signaling block 616 can transmit a new layer 3 message independent of the previously transmitted layer 3 message. The lower layer processing blocks in the MS 502 can continue to retransmit the layer 2 PDUs for the earlier outdated layer 3 message unnecessarily, which can waste scarce radio frequency bandwidth. In addition, unsuccessful reception of one or more of the layer 2 PDUs, which can include repeat retransmission failures, can ultimately lead to a termination of the radio frequency connection between the MS 502 and the wireless communication network 500. As will be described below, the layer 3 processing block can instruct the layer 2 processing blocks to purge older "outdated" layer 3 messages and cease transmitting their constituent layer 2 PDUs, rather than continue to send pending layer 3 messages and their constituent layer 2 PDUs that can no longer contain accurate measurement information. The layer 3 processing block can also send a reset message that can indicate to the wireless communication network 100 a reset of layer 2 sequence numbers associated with the layer 2 PDUs transmitted by the mobile wireless communication device 106.

Figure 7:
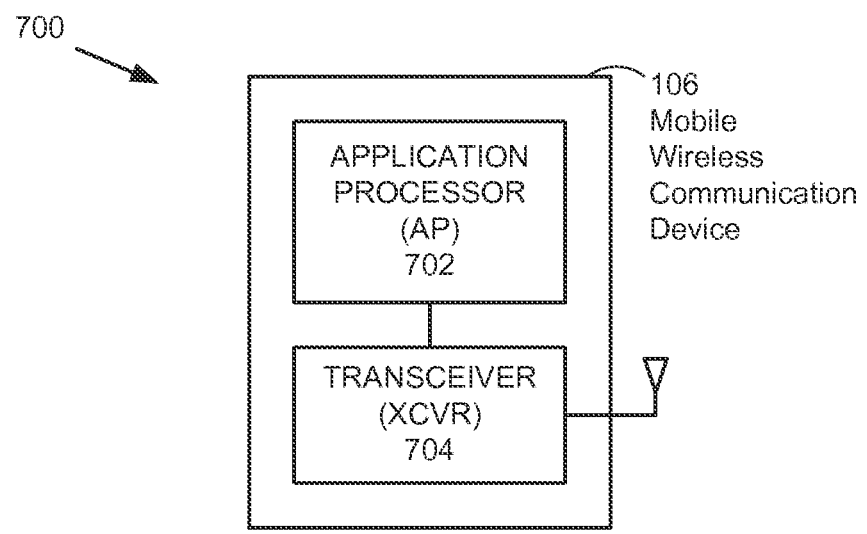
FIG. 7 illustrates a mobile wireless communication device.

FIG. 7 illustrates processing elements 700 of a mobile wireless communication device 106 including an application processor (AP) 702 and a transceiver (XCVR) 704. The AP 702 can perform higher layer functions, such as requesting connections and monitoring the performance of radio frequency links. The AP 702 can form messages that contain measurement information gathered from signals received by the mobile wireless communication device 106 through the XCVR 704. In some embodiments, the layer 3 processing blocks, such as the signaling block 616 shown in FIG. 6 and the radio resource control 308 block shown in FIG. 3, can be executed by the AP 702. The layer 2 processing blocks, including the link access control 606 and media access control 604 blocks shown in FIG. 6, as well as the radio link control 306 and media access control 304 blocks shown in FIG. 3, can be executed by the XCVR 704. In some embodiments, the layer 2 and layer 3 processing blocks can be contained in the same processing unit, and thus the division between the AP 702 and the XCVR 704 can also be achieved by different processing blocks operating within a more general purpose common computing unit.

Figure 8:
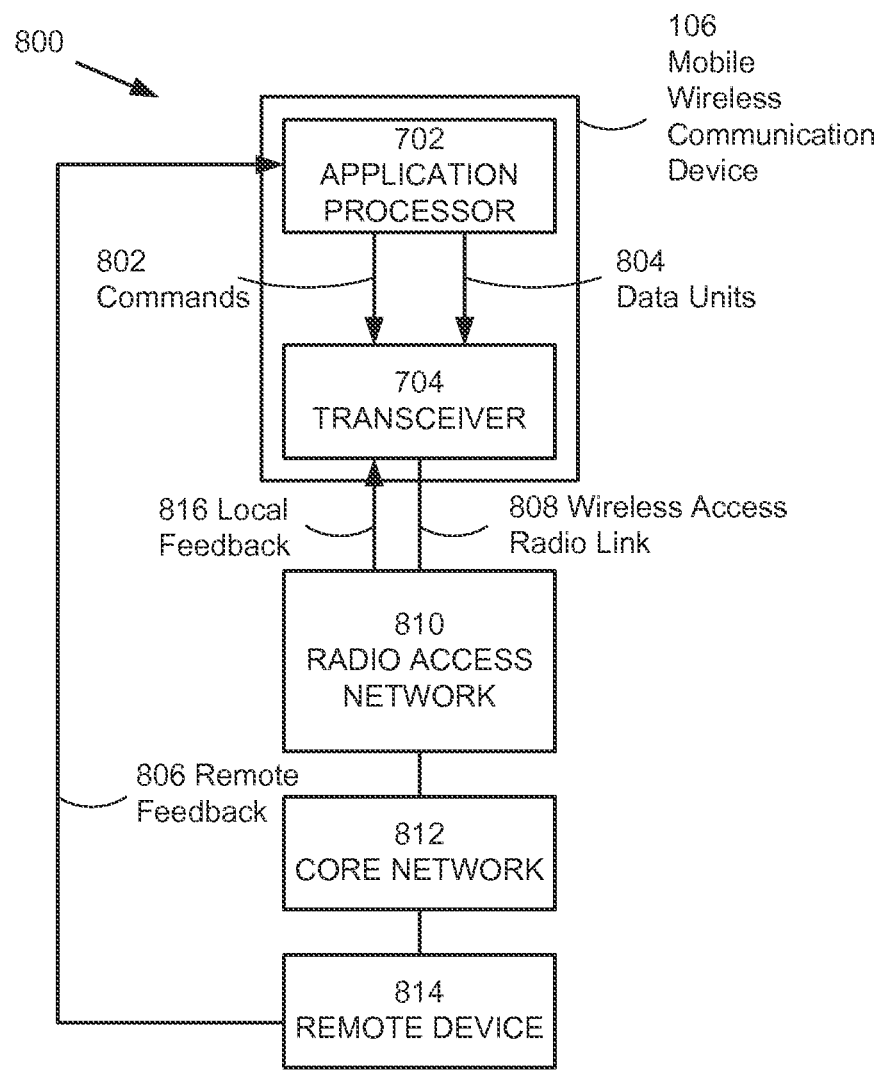
FIG. 8 illustrates communication from the mobile wireless communication device to a remote device.

FIG. 8 illustrates communication between processing elements in the mobile wireless communication device 106 and a remote device 814 through a wireless access radio link 808. The application processor 702 can generate data units 804, such as voice or data packets for a connection between the mobile wireless communication device 106 and the remote device 814. The data units 804 can also include signaling messages that can provide the wireless communication network 100 to which the mobile wireless communication device 106 can be connected information regarding the state of the mobile wireless communication device 106 and of the wireless access radio link 808. The data units 804 can be transferred to the transceiver 704 and be transformed to appropriately sized and formatted signals for transmission over the wireless access radio link 808 to the radio access network 810. The transformation of data units 804 into wireless transmissions can include dividing layer 3 SDUs into one or more layer 2 PDUs as described above. The application processor 702 can also send commands 802 to the transceiver 704, which can also include instructions to the transceiver 704 to indicate how data units 804 can be handled.

As described above, some data units 804, such as certain measurement messages can require acknowledgement from a destination point, such as the remote device 814 or from the radio access network 810, to ensure correct reception. Until acknowledgement is received, the transceiver 704 can repeatedly transmit a data unit 804 up to a maximum number of times set by a pre-determined counter value. In systems using a CDMA2000 communication protocol, an N1m counter value can be established that can indicate the maximum number of transmissions for a layer 2 PDU that requires acknowledgement. An acknowledgement of the transmitted data unit 804 can be received from the remote device 814 through a remote feedback path 806 or from the radio access network 810 through a local feedback path 816. Until the acknowledgement is received by the mobile wireless communication device 106, the application processor 702 and the transceiver 704 in the mobile wireless communication device 106 can consider the transmitted data unit 804 to be in transit but to not be confirmed to be received correctly by the remote device 814 or by the radio access network 810. In a CDMA2000 system, the N1m counter value can be applied to all L2 PDUs that are transmitted. In a dynamically changing radio frequency environment, however, information contained in some of the transmitted L2 PDUs, such as those associated with a radio frequency signal measurement, can change before the L2 PDU is correctly acknowledged. Thus, while retransmission of L2 PDUs that require acknowledgement can ensure proper reception, the retransmission can also result be unnecessary when newer values for the communicated information in the L2 PDUs exist.

Figure 9:
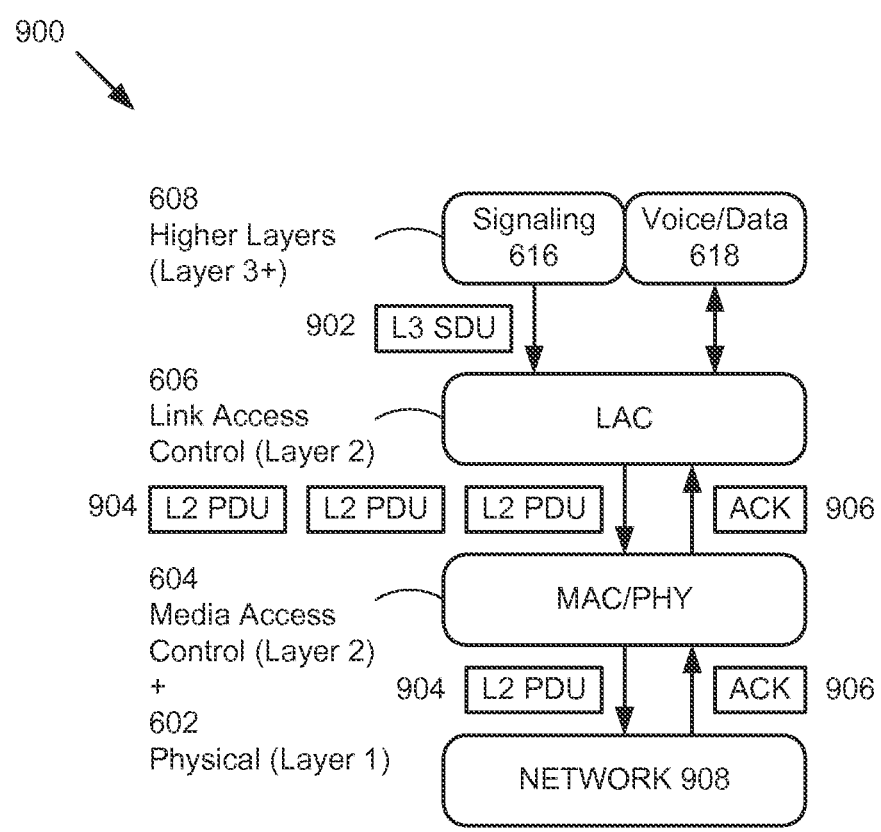
FIG. 9 illustrates packet communication with acknowledgements.

FIG. 9 illustrates communication 900 of a layer 3 SDU 902 through the communication protocol stack 600 shown in FIG. 6. A layer 3 SDU 902 can be generated by the signaling block 616 and transferred to the layer 2 LAC 606, which can transfer the layer 3 SDU 902 as one or more layer 2 PDUs 904 to the MAC/PHY 602/604 layers for radio frequency transmission to the network 908. An acknowledgement (ACK) 906 of the L2 PDU 904 by an endpoint in the network 908 can be received by the MAC/PHY 602/604 and passed to the layer 2 LAC 606. As a single L3 SDU 902 can require multiple layer 2 PDUs 904 for transmission, each layer 2 PDU 904 can require a separate acknowledgement (and when not acknowledged, each layer 2 PDU 904 can be retransmitted separately). In a CDMA2000 system, each layer 2 PDU 904 can be retransmitted up to N1m times if no acknowledgement is received from the destination point. For each layer 2 PDU in transit and awaiting acknowledgement, the layer 2 LAC 606 can maintain retransmission counters and can declare a retransmission timeout after a number of failed retransmissions. In a typical CDMA2000 system, N1m can be set to 13 and layer 2 PDU retransmissions can be spaced approximately 400 ms apart in time. Thus a complete sequence of retransmissions for a single layer 2 PDU can take more than 5 seconds. By the time the last retransmission occurs, the radio frequency conditions of the wireless communication network 100 as measured by the mobile wireless communication device 106 can have changed substantially. In a CDMA2000 system, the layer 2 LAC 606 can declare a loss of a logical channel 614 on which the layer 2 PDU 904 can be transmitted if no acknowledgement is received after transmitting the layer 2 PDU 904 N1m times. A loss of a logical channel 614 can result in termination of one or more connections between the mobile wireless communication device 106 and the network 908.

An exemplary layer 3 SDU 902 can include a pilot strength measurement message (PSMM) for a CDMA2000 system. The mobile wireless communication device 106 can measure the strength of signals sent on "pilot" channels by the BTS 506/510 in radio access network units 504/514 located within detectable range of the mobile wireless communication device 106. The PSMM can include several different information fields including a pseudo-random sequence number (PN) that can represent a sector in a cellular network 100, and a PN signal to interference strength Ec/Io. Each unique PN can represent a separate radio frequency link through which the mobile wireless communication device 106 can connect to the wireless communication network 100. The PSMM can also include an indication of how the mobile wireless communication device 106 would like to classify the PN, for example whether to include it in a set of pilots to which the mobile wireless communication device 106 can connect.

Figure 10:
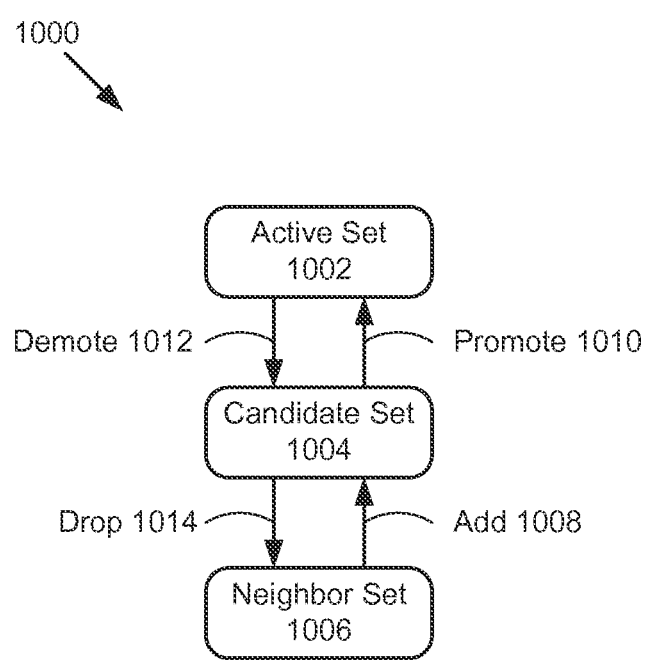
FIG. 10 illustrates pilot set maintenance in the mobile wireless communication device.

FIG. 10 illustrates a state diagram 1000 for classifications of pilots that can be maintained by a mobile wireless communication device 106. Each pilot known by the mobile wireless communication device 106 can be classified into one of three different sets. A neighbor set 1006 can include a set of neighbor base transceiver station pilots to which the mobile wireless communication device 106 can connect if there is sufficient signal strength. A candidate set 1004 can include a set of candidate base transceiver station pilots that satisfy a minimum strength level with which the mobile wireless communication device 106 can connect. An active set 1002 can include a set of active base transceiver station pilots to which the mobile wireless communication device 106 can be actively connected. The number of base transceiver station pilots included in the active set 1002 can be limited by the wireless communication network 100, typically six pilots or less. The strength of each pilot received by the mobile wireless communication device 106 can be measured periodically, and the mobile wireless communication device 106 can indicate the pilot strength measurements to the wireless communication network 100 by sending pilot strength measurement messages (PSMM).

A pilot in the neighbor set 1006 can be added (state transition 1008) to the candidate set 1004 by the mobile wireless communication device 106 when the measured pilot signal strength exceeds a pre-determined add threshold for a pre-determined add time period. The mobile wireless communication device 106 can move the pilot from the neighbor set 1006 to the candidate set 1004 and inform the wireless communication network 100 of the pilot movement through a PSMM. The mobile wireless communication device 106 can "add" a pilot to the candidate set 1004 without receiving an explicit command to do so by the wireless communication network 100. A pilot in the candidate set 1004 can be dropped (state transition 1014) to the neighbor set 1006 when measured pilot signal strength falls below a pre-determined drop threshold for a pre-determined drop period. The mobile wireless communication device 106 can move the pilot from the neighbor set 1006 to the candidate set 1004. The mobile wireless communication device 106 can inform the wireless communication network 100 of the pilot movement through a PSMM, although informing the wireless communication network 100 can be optional and not required. In representative embodiments, movement of a pilot between the candidate set 1004 and the neighbor set 1006 can occur without informing the wireless communication network 100. The mobile wireless communication device 106 can "drop" a pilot from the candidate set 1004 without receiving an explicit command to do so by the wireless communication network 100. Movement of pilots between the candidate set 1004 and an active set 1002, however, can require confirmation commands from the wireless communication network 100. In representative embodiments, movement of a pilot between the candidate set 1004 and an active set 1002 will always include an exchange of one or more messages with the wireless communication network 100.

The mobile wireless communication device 106 can detect that a pilot in the candidate set 1004 has a signal strength that satisfies a set of performance criteria for a pre-determined period of time (the performance criteria can include signal strength level as well as changes to signal strength over time, such as a slope of a measured signal strength curve). The threshold for a pilot to be promoted from the candidate set 1004 to the active set 1002 can be higher than the threshold for a pilot to be added to the candidate set from the neighbor set 1006. The mobile wireless communication device 106 can send a PSMM to the wireless communication network 100 requesting to promote (state transition 1010) the pilot from the candidate set 1004 to the active set 1002. The pilot can be promoted to the active set 1002 by the mobile wireless communication device 106 after receiving a handoff confirmation message from the wireless communication network 100. When no handoff confirmation message is received, the pilot can remain in the candidate set 1004.

Similar to promoting a pilot into the active set 1002, a pilot can be demoted from the active set 1002 to the candidate set 1004. The mobile wireless communication device 106 can detect that a pilot in the active set 1002 has a signal strength that falls below a pre-determined threshold level for a pre-determined period of time. The threshold for a pilot to be demoted can be different from the threshold for a pilot to be promoted. The mobile wireless communication device 106 can send a PSMM to the wireless communication network 100 requesting to demote (state transition 1012) the pilot from the active set 1002 to the candidate set 1004. A pilot in the active set 1002 can be demoted to the candidate set 1004 in response to receiving a handoff confirmation message from the wireless communication network 100. Thus, movement of pilots between the neighbor set 1006 and the candidate set 1004 can occur without confirmation. The mobile wireless communication device 106 can inform the wireless communication network 100 by sending one or more PSMM of the movement of the pilots; however informing the wireless communication network 100 can be optional and is not required. Movement of pilots between the active set 1002 and the candidate set 1004, however, can require confirmation from the wireless communication network 100 to the mobile wireless communication device 106. In representative embodiments, confirmation to move the pilots between the active set 1002 and the candidate set will always be sent or the movement will not occur. One or more PSMM can be sent by the mobile wireless communication device 106 to the wireless communication network 100, and confirmations can be returned from the wireless communication network 100 to the mobile wireless communication device 106. With a dynamically changing radio frequency environment, particularly during periods of low received signal quality during which PSMM can require multiple retransmissions before an acknowledgement is received by the mobile wireless communication device 106, a decision to move a pilot can be superseded by a new decision to not move the pilot. In this case, the "old" pilot strength measurement message can be discarded, and a "new" pilot strength measurement message can be sent instead.

Figure 11:
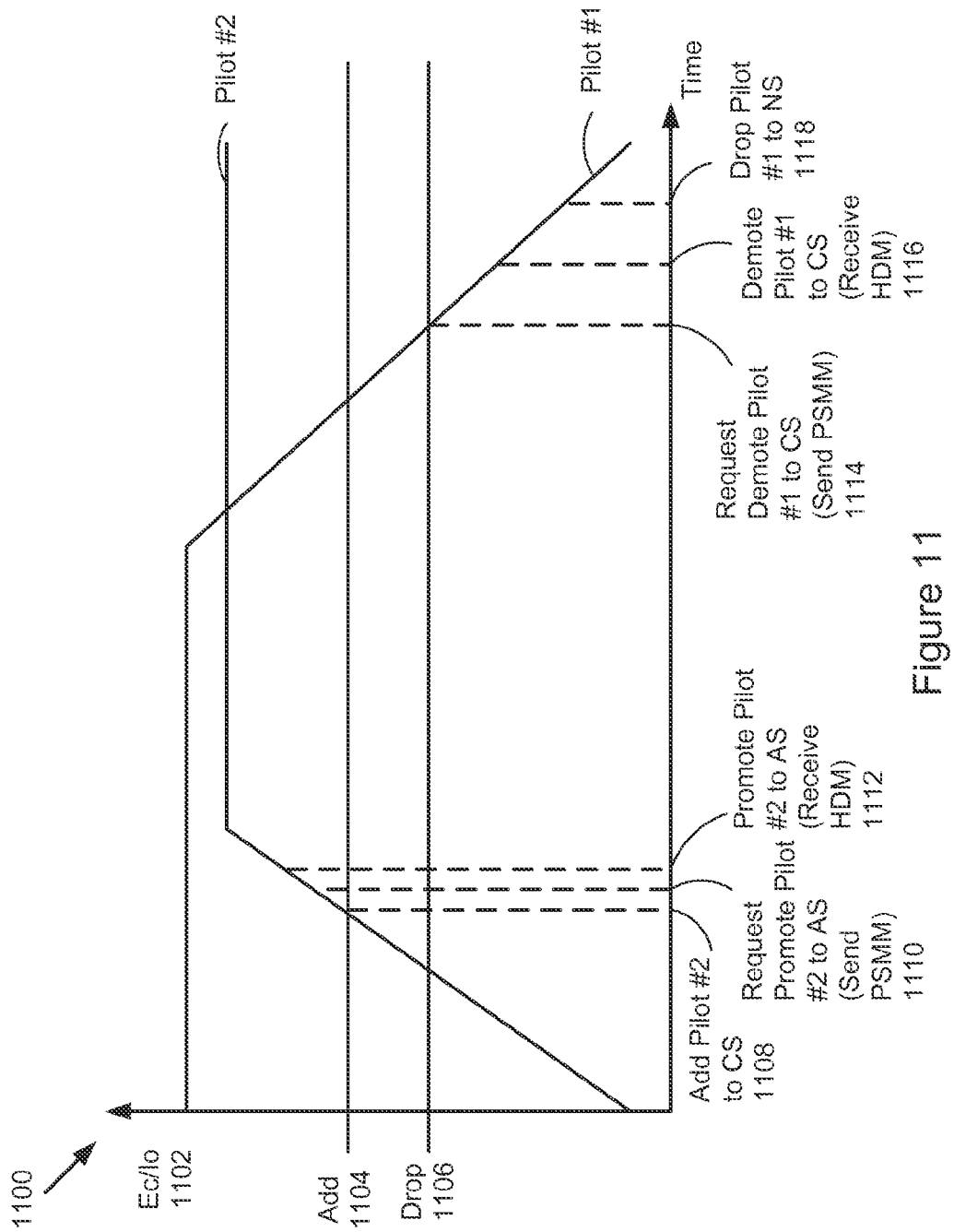
FIG. 11 illustrates pilot movement among pilot sets based on changing signal quality.

FIG. 11 illustrates a graph 1100 with movement of two pilots between sets in the mobile wireless communication device 106. Pilot signal strength can be measured and reported as a signal to noise/interference ratio Ec/Io 1102 as indicated. (Alternative measures such as received signal strength or other signal quality metrics can also be used in place of the Ec/Io 1102 shown herein for illustration.) An add threshold 1104 and a drop threshold 1106 can be set for different levels of Ec/Io 1102. Initially a first pilot #1 can have a high Ec/Io 1102 while a second pilot #2 can have a low Ec/Io 1102. The first pilot #1 can be in the active set, while the second pilot #2 can be in the neighbor set, as shown initially at the left side of the graph 1100. The second pilot #2 signal, as received and measured by the mobile wireless communication device 106, can then be increasing over time and surpass the add threshold 1104. The mobile wireless communication device 106 can add the second pilot #2 to the candidate set (CS) from the neighbor set (NS) at time 1108 when the second pilot #2 measured Ec/Io can surpass the add threshold 1104. After a pre-determined period of time, during which the second pilot #2 Ec/Io 1102 can be above the add threshold continuously, the mobile wireless communication device 106 can request to promote the second pilot #2 to the active set by sending a PSMM to the wireless communication network 100 at time 1110. In response to receiving a handoff direction message (HDM) from the wireless communication network 100, the mobile wireless communication device 106 can promote the second pilot #2 to the active set at time 1112. Following the promotion of the second pilot #2, the first pilot #1 and the second pilot #2 can both be in the active set.

Signal conditions received at the mobile wireless communication device 106 can subsequently continue to change. With changing signal conditions, the first pilot #1 can degrade in signal quality while the second pilot #2 can maintain a relatively high signal quality. This can occur, for example, when the mobile wireless communication device 106 moves closer to the BTS from which the second pilot #2 emanates and further away from the BTS from which the first pilot #1 is transmitted. The mobile wireless communication device 106 can continuously measure the Ec/Io for each pilot received to compare the quality of signals received from pilots in the active set. Relatively poorer performing pilots can be demoted when appropriately determined by the mobile wireless communication device 106 and confirmed by the wireless communication network 100. As shown in FIG. 11, at time 1114, the mobile wireless communication device 106 can request to demote the first pilot #1 from the active set to the candidate set when the first pilot #1 falls below a drop threshold 1106 by sending a second PSMM to the wireless communication network 100. In response to a handoff direction message confirmation from the wireless communication network 100, the mobile wireless communication device 106, at time 1116, can demote the first pilot #1 from the active set to the candidate set. Subsequently the signal quality of the first pilot #1 can continue to decline. After measuring the signal quality of the first pilot #1 falling below a drop threshold 1106 for a pre-determined period of time, the mobile wireless communication device 106 can drop the first pilot #1 from the candidate set to the neighbor set at time 1118.

Figure 12:
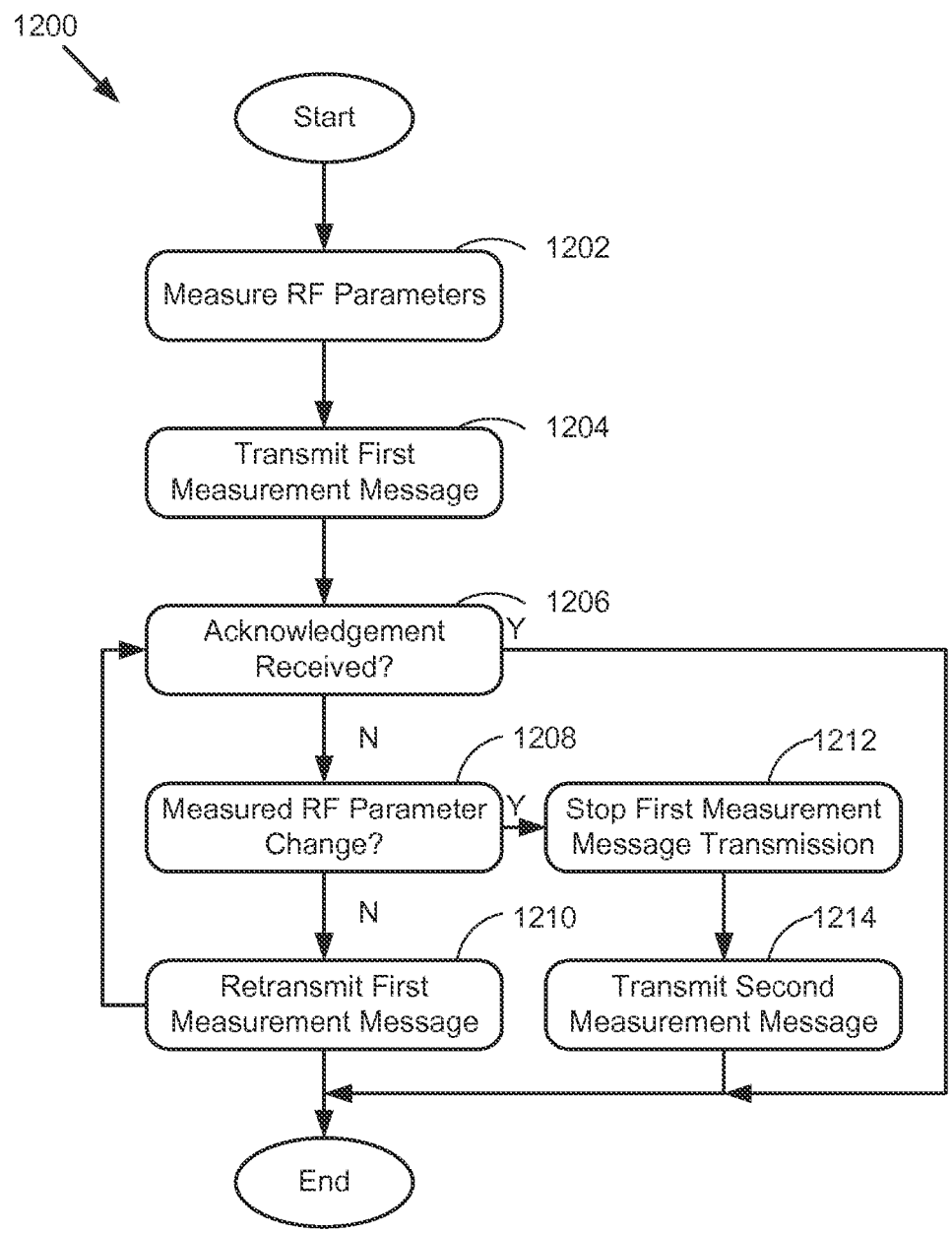
FIG. 12 illustrates a method for measurement message control in a mobile wireless communication device.

FIG. 12 illustrates a representative method 1200 to control measurement messaging in a mobile wireless communication device 106. The mobile wireless communication device 106 can measure one or more radio frequency (RF) parameters in step 1202. The radio frequency parameters can be measured based on signals received from one or more different base transceiver stations located in a wireless communication network 100. In step 1204, the mobile wireless communication device 106 can transmit a first measurement message to the wireless communication network 100. The first measurement message can contain information for requesting a set management change based on the measured RF parameters. A request for a set management change can include adding or dropping radio frequency resources in use for communication between the mobile wireless communication device 106 and the wireless communication network 100. Information in the first measurement message can also include reporting measured signal strength and quality. In step 1206, the mobile wireless communication device 106 can determine if an acknowledgement has been received from the wireless communication network 100 to the transmitted first measurement message within a pre-determined waiting time period. If an acknowledgement has been received then the process can end. If, however, no acknowledgement has been received within the pre-determined waiting time period, the mobile wireless communication device 106 can determine if one or more of the RF parameters measured in step 1202 have changed after the first measurement message was transmitted. A change in RF parameters can be significantly large that the first measurement message can be no longer valid. If the measured RF parameter change is not significantly large, then in step 1210 the mobile wireless communication device 106 can retransmit the first measurement message and repeat the cycle. If, however, the measured RF parameter change is significantly large then the mobile wireless communication device 106 can stop transmission of the first measurement message to the wireless communication network 100 in step 1212, as the information in the first measurement message can be no longer valid. Subsequently, in step 1214, the mobile wireless communication device 106 can transmit instead a second measurement message to the wireless communication network 100 that supersedes the first measurement message. In one embodiment, the first and second measurement messages can be layer 3 SDUs transmitted as a numbered sequence of layer 2 PDUs to the wireless communication network 100. In one embodiment, after stopping transmission of the first measurement message, a reset message can be sent to reset layer 2 PDU sequence numbers used by the mobile wireless communication device 106.

Figure 13:
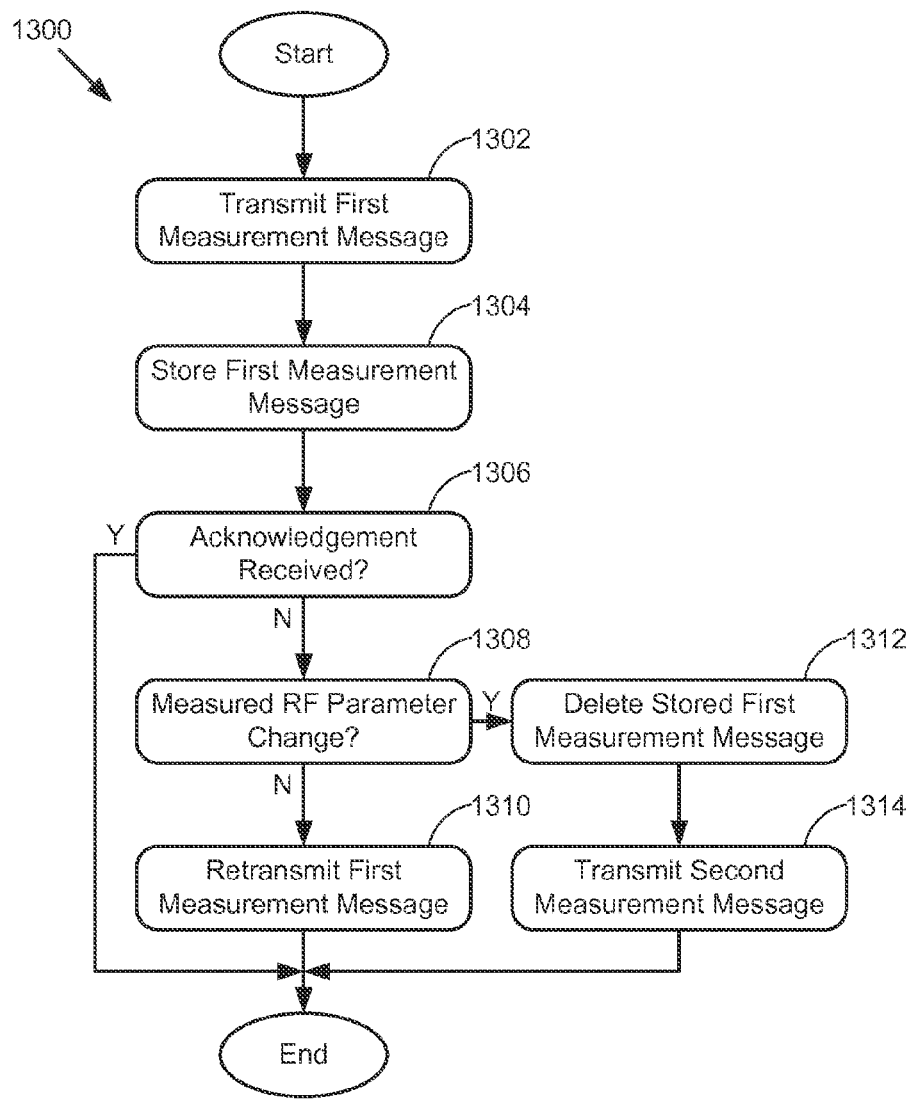
FIG. 13 illustrates a second method for measurement message control in a mobile wireless communication device.

FIG. 13 illustrates a second representative method 1300 for controlling measurement messaging between a mobile wireless communication device 106 and a wireless communication network 100. In step 1302 a first measurement message can be transmitted by the wireless communication device 106 to the wireless communication network. In step 1304, the transmitted first measurement message can be stored in the mobile wireless communication device 106 pending acknowledgement from the wireless communication network 100. In step 1306, the mobile wireless communication device 106 can determine if an acknowledgement has been received to the transmitted first measurement message within a pre-determined time period. If yes, then the method can end. If no, then in step 1308, the mobile wireless communication device 106 can determine if one or more measured radio frequency parameters have changed significantly during the interim waiting period while the first measurement message is pending acknowledgement. If an RF parameter has not changed significantly then the mobile wireless communication device 106 in step 1310 can retransmit the first measurement message. If an RF parameter has changed significantly during the interim period awaiting acknowledgement, the mobile wireless communication device 106 can delete the stored first measurement message in step 1312 and transmit instead a second measurement message in step 1314. In one embodiment, the first and second measurement messages can be layer 3 SDUs transmitted as a numbered sequence of layer 2 PDUs to the wireless communication network 100. In one embodiment, after deleting the first measurement message, a reset message can be sent to reset layer 2 PDU sequence numbers used by the mobile wireless communication device 106.

Various aspects of the described embodiments can be implemented by software, hardware or a combination of hardware and software. The described embodiments can also be embodied as computer program code on a computer readable medium. The computer readable medium is any data storage device that can store data which can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method to control measurement messaging in a mobile wireless device, the method comprising the mobile wireless device at least:

transmitting to a wireless network a first measurement message as a first set of one or more data units, the first measurement message including one or more radio frequency measurement values, and wherein each data unit, in the first set of one or more data units, requires acknowledgement; and when at least one of the one or more radio frequency measurement values requires updating before receiving acknowledgement for all data units of the first measurement message, transmitting to the wireless network a second measurement message as a second set of one or more data units, the second measurement message including an updated value for at least one of the one or more radio frequency measurement values.

2. The method of claim 1, wherein the first measurement message comprises a layer 3 service data unit (SDU) and each data unit comprises a layer 2 protocol data unit (PDU).

3. The method of claim 2, further comprising the mobile wireless device:
retransmitting to the wireless network each layer 2 PDU that is not acknowledged within a predetermined time interval following a most recent transmission of the layer 2 PDU.

4. The method of claim 2, further comprising the mobile wireless device:
flagging each layer 2 PDU to indicate requiring acknowledgement.

5. The method of claim 1, further comprising the mobile wireless device:
storing the first measurement message pending acknowledgement of the first set of one or more data units; and
when the at least one of the one or more radio frequency measurement values requires updating before receiving acknowledgement for all data units of the first measurement message, deleting the stored first measurement message.

6. The method of claim 2, further comprising the mobile wireless device:
using an automatic repeat request (ARQ) function to trigger retransmission of unacknowledged layer 2 PDUs.

7. The method of claim 2, further comprising the mobile wireless device:
setting a polling bit in a field of a layer 2 PDU having a last sequence number for the first measurement message to request a status report from the wireless network;
receiving the status report from the wireless network; and
retransmitting to the wireless network any missing or incorrectly received layer 2 PDUs based on the status report.

8. The method of claim 1, wherein the first and second measurement messages comprise pilot strength measurement messages, and the mobile wireless device operates in accordance with a code division multiple access (CDMA) wireless communication protocol.

9. A mobile wireless device, comprising:
an application processor coupled to a transceiver and arranged to execute instructions, which when executed cause the application processor to:
form a first measurement message including one or more radio frequency measurement values;
provide the first measurement message to the transceiver to transmit to a wireless network as a first set of one or more data units, wherein each data unit in the first set of one or more data units requires acknowledgement; and
when at least one of the one or more radio frequency measurement values requires updating before receiving acknowledgement for all data units of the first measurement message, form a second measurement message including an updated value for at least one of the one or more radio frequency measurement values, and provide the second measurement message to the transceiver to transmit to the wireless network as a second set of one or more data units.

10. The mobile wireless device of claim 9, wherein the first measurement message comprises a layer 3 service data unit (SDU), and wherein each data unit comprises a layer 2 protocol data unit (PDU).

11. The mobile wireless device of claim 10, wherein the transceiver is configured to retransmit to the wireless network each layer 2 PDU that is not acknowledged within a predetermined time interval of a most recent transmission of the layer 2 PDU.

12. The mobile wireless device of claim 9, wherein the application processor is further arranged to execute instructions to, when executed, cause the application processor to:
store the first measurement message pending receipt of an acknowledgement of the first measurement message from the wireless network; and
delete the first measurement message when the first measurement message is out of date and no acknowledgement of the first measurement message is received.

13. The mobile wireless device of claim 10, wherein the transceiver is configured to flag each layer 2 PDU to indicate requirement acknowledgement.

14. The mobile wireless device of claim 10, wherein the transceiver is configured to use an automatic repeat request (ARQ) function to trigger retransmission of unacknowledged layer 2 PDUs.

15. The mobile wireless device of claim 10, wherein the application processor is further arranged to execute instructions, which when executed cause the application processor to:
maintain a state of the mobile wireless device, wherein the first and second measurement messages include a current value for the state of the mobile wireless device.

16. The mobile wireless device of claim 10, wherein the transceiver is configured to measure at least one radio frequency parameter for one or more connections between the mobile wireless device and the wireless network, and wherein the first and second measurement messages include a current value for the measured at least one radio frequency parameter.

17. The mobile wireless device of claim 16, wherein the at least one of the one or more radio frequency measurement values requires updating when the measured at least one radio frequency parameter for the one or more connections indicates a change in signal quality for at least one of the one or more connections exceeding a predetermined threshold.

18. The mobile wireless device of claim 10, wherein the transceiver is configured to:
set a polling bit in a field of a layer 2 PDU having a last sequence number for the first measurement message to request a status report from the wireless network;
receive the status report from the wireless network; and
retransmit to the wireless network any missing or incorrectly received layer 2 PDUs based on the status report.

19. A non-transitory computer readable medium having at least one program stored thereon and configured to, when executed by one or more processors, cause a mobile wireless device to:
transmit to a wireless network a first measurement message as a first set of one or more data units, the first measurement message including one or more radio frequency measurement values, and each data unit in the first set of one or more data units requires acknowledgement; and
when at least one of the one or more radio frequency measurement values requires updating before receiving acknowledgement for all data units of the first measurement message, transmit to the wireless network a second measurement message as a second set of one or more data units, the second measurement message including an updated value for at least one of the one or more radio frequency measurement values.

20. The non-transitory computer readable medium of claim 19, wherein the first measurement message comprises a layer 3 service data unit (SDU), wherein each data unit comprises a layer 2 protocol data unit (PDU), and wherein the least one program is further configured to, when executed by the one or more processors, cause the mobile wireless device to:
retransmit to the wireless network each layer 2 PDU that is not acknowledged within a predetermined time interval of a most recent transmission of the layer 2 PDU.

* * * * *